Sept. 15, 1931.   T. BARISH   1,823,640
BEARING INCLOSURE
Filed Sept. 22, 1928

Inventor
Thomas Barish
By Clarence H. Walker
His Attorney

Patented Sept. 15, 1931

1,823,640

UNITED STATES PATENT OFFICE

THOMAS BARISH, OF JAMESTOWN, NEW YORK, ASSIGNOR TO MARLIN-ROCKWELL CORPORATION, OF JAMESTOWN, NEW YORK, A CORPORATION OF NEW YORK

BEARING INCLOSURE

Application filed September 22, 1928. Serial No. 307,639.

This invention relates to an improvement in bearing inclosures and more particularly to the manner and method of securing a grease fitting thereto.

The purpose of a bearing inclosure of this type is to enclose or cover a bearing, protecting it from dirt and providing space capable of holding grease by which to lubricate the bearing. In order to facilitate the greasing of a bearing, the inclosure is provided with a suitable grease fitting which permits grease to be forced into the interior thereof. The fitting is provided with a suitable valve which prevents dirt from entering the inclosure and coming in contact with the moving parts of the bearing. At the present time grease fittings are secured to bearing inclosures by welding or through the use of rivets. It is obvious that due to the continual strain under which a bearing operates, the welded or riveted fitting becomes loosened from the inclosure thus permitting dirt to enter the bearing or allowing the grease within the bearing to run out therefrom. Without a sufficient quantity of grease or with dirt particles between the two races, the bearing will fail to perform satisfactorily. In order to prevent the dislodgment of the grease fitting from close engagement with the inclosure, applicant has provided an inclosure which receives a grease fitting in a recessed portion thereof and causes the outer race of the clutch bearing to retain this fitting in place.

The principal object of this invention is the provision of a bearing inclosure or cover having a pressed out recess within which a grease fitting is located and held in place by contact with the outer race of the enclosed bearing.

Another object of this invention is the provision of a bearing inclosure or cover having a rolled edge by which to lock the outer race in engagement with said inclosure and also lock the grease fitting between these two members.

Other and further objects of this invention will appear from a consideration of the following specification taken in connection with the accompanying drawings, and in which Fig. 1 is a side elevation of one modification of this invention and illustrates the location thereof in conjunction with a clutch unit;

Figure 1:
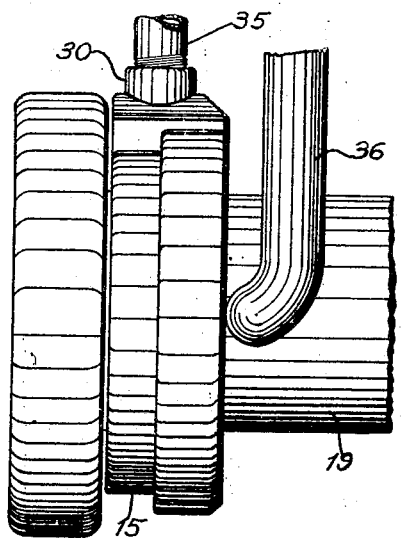
Figure 2:
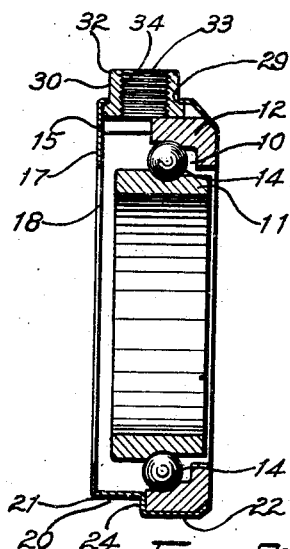
Fig. 2 is a vertical sectional view taken through the bearing and bearing inclosure, illustrating the manner of securing the cover in engagement with the outer race of the bearing.

Referring to the drawings and more particularly to Fig. 2 thereof, this invention is adapted for application upon a clutch throwout bearing 10 having inner and outer races 11 and 12. The races 11 and 12 are suitably spaced from each other by balls 14 which are held in place in tracks provided in the adjoining faces of each race. The inclosure 15, being pressed from sheet metal of any desired thickness, is a cup shaped member having a vertical wall 17 provided with a cylindrical opening 18 through which the shaft 19 is adapted to pass. The horizontal wall 20 of the inclosure 15, which encloses the outer race 12 of the bearing, is formed to provide walls 21 and 22. The wall 21, being of slightly lesser diameter than the wall 22, is adjacent the vertical wall 17. A short vertical wall or flange 24 connects the walls 21 and 22.

Figure 3:
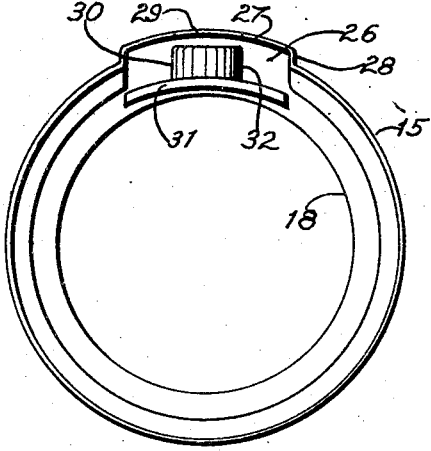
Fig. 3 is a front elevation of the bearing inclosure and illustrates the method of positioning the grease fitting thereon.
Figure 5:
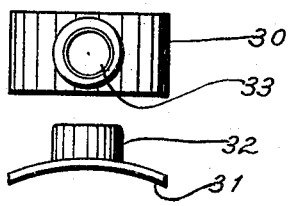
Fig. 5 constitutes a side elevation and plan view of the grease fitting shown in the previous figures.

As shown in Fig. 3 of the drawings, the annular walls 21 and 22 at a coincidental point of their circumference diverge to form a pocket or recess 26. This recess is defined by an outer wall 27, shaped to conform to the contour of the inclosure, and end walls 28. The wall 27 extends the full depth of the inclosure and is provided with a central annular opening 29 therethrough.

A grease fitting 30, having a base flange 31 and neck 32 is adapted to be mounted in the recess 26. The annular neck 32, when the fitting 30 is in place, projects through the opening 29 of the wall 27. The neck 32 is provided with an opening 33 therethrough having threads 34 adapted to receive an alemite or other grease connection 35. The length of the flange 31 corresponds to the length of the recess 26 but the width of this flange, however, is less than the width of said recess for a purpose which will later be brought out.

Figure 4:
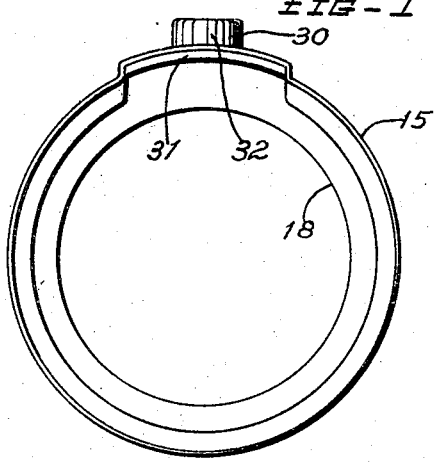
Fig. 4 is a front elevation of the structure shown in Fig. 3 and illustrates the position of the grease fitting when in complete engagement with the inclosure.

When it is desired to enclose a bearing within an inclosure of this type, it is first necessary to insert the grease fitting 30 into the recessed portion 26 thereof forcing it to occupy a position such that the flange 31 thereof will engage the outer wall of the recess and the neck 32 will extend through and beyond said wall (see Fig. 4). The bearing 10 may now be placed within the inclosure 15. Attention is called to the fact that the outer race 12 of the bearing is of a diameter such that it will engage the wall 22 of the inclosure to a depth where the edge thereof strikes the flange 24. Inasmuch as the outer race is of considerably less width than that of the inner race, when the outer race is in contact with the flange 24, the inner race will be centrally located within the inclosure as shown in Fig. 2 of the drawings. In order to retain the bearing within the inclosure it is necessary to roll the outer edge of the wall 22 inwardly into engagement with the wall of the outer race 12. When this is done the bearing 10 is moved to firmly seat within the inclosure 15. A further advantage to be derived from rolling the edge of the wall 22 is to engage said edge with the remaining unengaged edge of the fitting. In this manner the fitting is secured in place being in contact with the four walls of the recess. It is to be noted that the inner race 11 does not closely approach the wall 17 of the cover whereby undesirable wear may occur and also that the vertical face of the race 12 is free to be engaged by the clutch actuating arms 36.

The above described invention, while extremely simple in design, is adapted to overcome present bearing inclosure troubles by eliminating the dependance upon welds or rivets to retain a grease fitting in position upon the cover.

Although only one modification of this invention has been shown and described, applicant does not intend to be limited thereto since it is obvious that other modifications and adaptations may be made without departing from the spirit and scope of this invention as set forth in the following claims.

Having thus set forth my invention what I claim is new and for which I desire protection by Letters Patent is:

1. A grease retaining inclosure for bearings comprising a cup shaped cover, stepped walls forming the sides of said cover, one of said walls being of greater diameter than the other, a recess in said cover formed by the coincidental divergence of said vertical walls, a grease fitting mounted within said recess and means adapted to removably retain said fitting in place.

2. A grease retaining inclosure for bearings comprising a cup shaped cover having base and side walls, said side wall being provided with a circumferentially stepped portion therein of reduced diameter, a recess in said cover formed by the coincidental divergence of both portions of said side wall, a grease fitting mounted in said recess and means within said cover adapted to removably secure said fitting in place.

3. A grease retaining inclosure for bearings comprising a cup shaped cover having base and side walls, said side wall being circumferentially stepped to produce a diametrically reduced portion therein, said side wall being provided with a raised portion forming a recess, the outer wall of said recess having an opening therethrough, a grease fitting mounted within said recess and adapted to be held in engagement with said cover by contact with the enclosed bearing.

4. A grease retaining inclosure for bearings comprising a cup shaped cover having base and side walls, said side wall being circumferentially stepped to produce a diametrically reduced portion therein, said side wall being provided with a raised portion forming a recess, the outer wall of said recess having an opening therethrough, a grease fitting having a base flange and neck integral therewith mounted within said recess whereby the neck thereof projects through the outer wall of said recess and said flange engages both walls of said recess being held in engagement with said cover by contact with the outer surface of the enclosed bearing.

5. A grease retaining inclosure for bearings comprising a cup shaped cover having a recess formed by an outwardly pressed portion of the side wall of said cover, a grease fitting mounted within said recess, means adapted to removably secure said fitting in engagement with said cover and a further means adapted to secure the enclosed bearing against removal from said inclosure.

In testimony whereof I have affixed my signature.

THOMAS BARISH.